June 25, 1968     C. A. FENWICK     3,389,678

DISPLAY FOR RADIO ALTIMETER

Filed Nov. 26, 1965

INVENTOR.
CHARLES A. FENWICK

BY Marvin Moody

ATTORNEY

United States Patent Office 3,389,678
Patented June 25, 1968

3,389,678
DISPLAY FOR RADIO ALTIMETER
Charles A. Fenwick, Cedar Rapids, Iowa, assignor to Collins Radio Company, Cedar Rapids, Iowa, a corporation of Iowa
Filed Nov. 26, 1965, Ser. No. 509,991
3 Claims. (Cl. 116—129)

ABSTRACT OF THE DISCLOSURE

An indicator display for a radio altimeter is provided with a rotatable cutout pointer cooperating with cutout numerals. The rear mounting plate is color-coded such that as the altimeter reading changes, a different color appears through the cutout portion of the pointer and numerals to indicate at a glance that there has been a change in altitude.

---

This invention relates in general to indicators and in particular to an altimeter.

It is oftentimes desirable as, for example, in aircraft, to accurately indicate to the pilot his altitude. For example, at present work is being done to reduce the visibility and ceiling limitations on aircraft operation to zero-zero. To accomplish such results, extremely accurate altimeters and other instruments must be provided for the control of the aircraft.

It is an object of the present invention therefore to provide a novel altimeter indicator which very accurately indicates altitude in the near vicinity of the ground until contact is made.

Another object of the invention is to provide an altimeter which is color coded to capture the pilot's attention so he recognizes at a glance or out of the corner of his eye that an altitude change has occurred.

Another object of the invention is to provide an indictor which has no indicating arrow when the altimeter is not in operation.

A feature of this invention is found in the provision for a color coded back plate, a rotatable indicator disc, and a fixed front plate mounted such that the rotatable indicator disc is driven by suitable function shaft to provide an indication.

Further features, objects and advantages of this invention will become apparent from the following description and claims when read in view of the accompanying drawing, in which:

Figure 1:
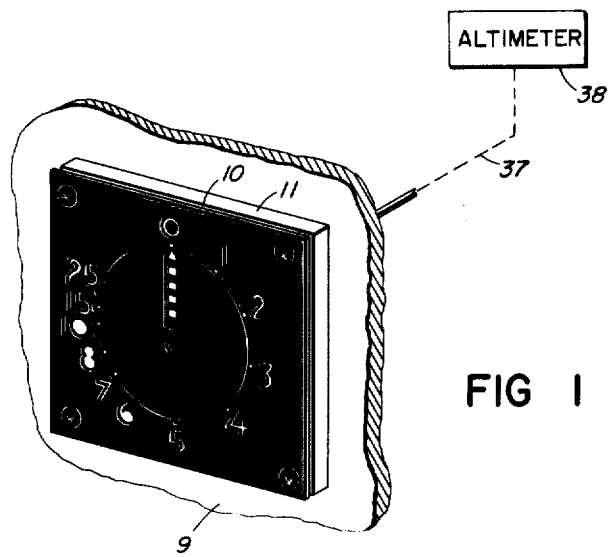
FIGURE 1 illustrates the indicator of this invention.

FIGURE 1 illustrates the indicator of this device which consists of a fixed rear color sector 10 painted or attached to a suitable mounting plate 11. The mounting plate 11 might be made of transulucent material such as Lucite to allow side lighting. The mounting plate 11 may be suitably mounted on the instrument panel 9 of an aircraft in a conventional manner. Color sector 10 is formed with sectors of various colors. For example, in FIGURE 2 a first black sector 12 adjacent the top center portion is generally triangular in shape and extends to adjacent the center 13 of the color sector 10. A rectangular relatively small white portion 14 is formed on the color sector plate 10 between black section 12 and a second color section 16 formed at the upper right portion of the color sector 10. A zero black portion 17 is formed in the white section 14 for purposes to be described later. A lower portion 15 of the white sector 14 is formed with a narrow indicator portion 18 which is checked with alternate white and black portions. The second color segment 16 is formed with a bi-color portion 19 adjacent the checkered portion 18. Arcuate segments 21 in a third color are printed on the predominant color of sector 16.

Figure 2:
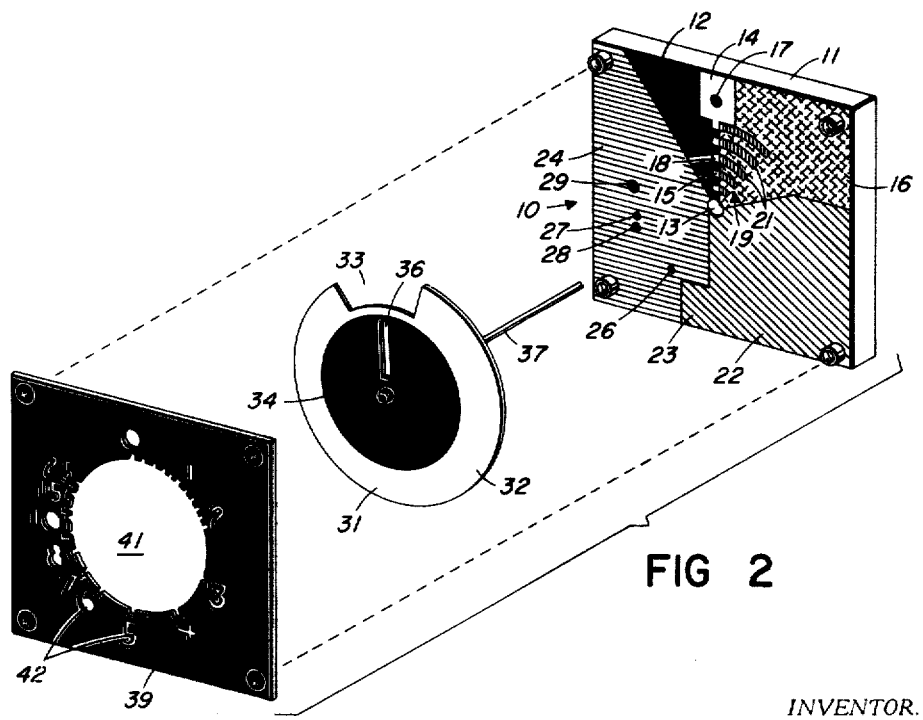
FIGURE 2 is an exploded view of the indicator.

A third major color sector portion 22 is formed in the lower right-hand portion relative to FIGURE 2 on the sector-color 20 and has a projection 23 which extends to the left of lower center relative to FIGURE 2. The remaining portion 24 of the color sector is colored a fifth color and is formed with a spot 26 for six, two spots 27 and 28 for eight and a single spot 29 for ten.

An intermediate rotating disc 31 is rotatably supported on plate 11 by shaft 37. The rotating disc 31 is generally circular and is formed with an outer white portion 32 into which is formed a cutout segment 33. The center portion 34 of the rotating disc 31 is formed of black non-translucent material and has an arrow-shaped opening 36 formed therein which centers with the cutout segment 33. The rotating shaft 37 is attached to plate 11 and drives disc 31. The shaft 37 is also coupled through a suitable servo system to an altimeter 38.

A fixed front plate 39 is attached to the suporting plate 11 by set screws or other means and is provided with a central opening 41 in which the black portion 34 of the rotating disc 31 is received. Numerical indicia 42 are formed about the periphery of the opening 41 through the fixed front plate 39 and, in a particular example, the indicia might run from 0 to 25. The 0, 6, 8 and 0 forming a part of the ten indicia in the fixed front plate are formed with only the outer openings in the fixed cover plate.

The 0 dot 17, the 6 dot 26, the two dots 27 and 28 for 8 and dot 29 for 10 on the color sector 10 are aligned with these numerals, respectively, of the cover plate 39 so that when the rotating disc 31 has its arrow and cutout segment 33 aligned with 0, 6, 8 or 10 these dots are visible through the cutout segment 33.

In use, if the altimeter is not operating or the altitude of the aircraft is above the maximum indicated altitude of the instrument, the rotating disc 31 is positioned such that the arrow cutout 36 extends generally upwardly and to the left relative to FIGURE 1 so that the black background 12 is in line with the arrow cutout 36 and the arrow is not visible. When the altimeter is energized to produce an output within range of the indicating instrument, the disc 31 is driven by the shaft 37 so that the arrow cutout 36 moves to indicate the altitude of the aircraft. In such altimeters the height above the ground or runway is being indicated for extremely accurate instrument landings. Thus, such altimeters are needed only below 2500 feet, for example, and must be particularly accurate in the last few hundred feet. As the aircraft passes below the 2500 foot level, the disc 31 rotates and the arrow cutout 36 aligns with the color coded sector 24 and the cutout sector 33 allows the color coded portion to align with the numerals adjacent the arrow cutout.

As the altitude decreases, the disc 31 rotates thus aligning the arrow 36 with lower and lower altitude indications until the altimeter reaches about 500 feet. At that time, the arrow 36 passes from the color coded section 24 to the color coded section 22 and a second color becomes visible to the pilot behind the arrow and the numerals against which the arrow is reading, in this case 500 feet. Due to the sector cutout portion 33 the numerals are colored only adjacent the arrow 36 so as the arrow passes from one number to another the new numbers are color coded and the numbers from which the arrow has passed are changed to a white indication. The change in color indicates to the pilot that a change in altitude has occured and serves to draw his attention to the change.

As the altitude is decreased to 400 and 300 feet, the arrow and numerals will pass the color sector 22. As an altitude of 200 feet is reached, a second color change will occur in the arrow and the numerals as the disc 31 moves to align color segment 16 with the arrow. At 100 feet, the two-tone sector 19 appears behind the arrow 36 to indicate the aircraft is closely adjacent the ground. This indication continues until the aircraft actually touches down on the runway, at which time the arrow will change to the black and white checkered indication 18 indicating zero altitude.

It is seen that this invention provides a new and novel indicator which is color coded so as to dramatically indicate to the pilot changes in altitude and although it has been described with respect to a particular embodiment thereof, it is not to be so limited, as changes and modifications may be made therein which are within the spirit and scope of the invention as defined by the appended claims.

I claim:

1. A indicator comprising a supporting plate formed with a plurality of color coded segments thereon, a rotating disc rotatably supported on the supporting plate and formed with an arrow cutout through which the color-coded segments are visible, a fixed front plate formed with a central opening through which said rotating disc is visible and formed with openings forming numerals about the central opening and the rotating disc formed with a cutout sector which aligns with the numerals behind the fixed cover plate and which extends beyond the numerals in the uncutout portion of the rotating disc to allow the numerals to be color coded when adjacent the arrow cutout.

2. In apparatus according to claim 1 wherein the formed numerals comprising the 0, 6, 8 and 0 forming a part of the 10 are formed only with their outer outlines on the front plate and the center outlines are formed on the supporting plate so that the numerals are completed when the cutout portion of the rotating disc is aligned with these respective numerals.

3. A color-coded indicator comprising a supporting plate with one face formed into a plurality of sectors of color-coded portions, a rotatable disc supported by the supporting plate and said disc formed with an arrow cutout portion through which the various color-coded sections are visible, said rotating disc having a peripheral portion with a cutout segment adjacent the arrow formed in the rotating disc, a cover plate formed with a central opening through which the rotating disc is visible and formed with openings forming numerals about its periphery and said numerals color coded due to the background of the fixed color sector plate being visible through the sector cutout of the rotating disc.

References Cited

UNITED STATES PATENTS

| | | | |
|---|---|---|---|
| 1,847,903 | 3/1932 | Schubert | 116—129 |
| 2,158,925 | 5/1939 | Braswell | 116—129 |

DAVID SCHONBERG, *Primary Examiner.*

J. W. ROSKOS, *Assistant Examiner.*